United States Patent [19]

Schwartz

[11] Patent Number: 5,523,774

[45] Date of Patent: Jun. 4, 1996

[54] STATUS DISPLAY FOR REMOTELY-LOCATED CONTROL PANEL

[75] Inventor: David R. Schwartz, Bellevue, Wash.

[73] Assignee: Siemens Medical Systems, Inc., Iselin, N.J.

[21] Appl. No.: 516,731

[22] Filed: Aug. 18, 1995

Related U.S. Application Data

[63] Continuation of Ser. No. 129,969, Sep. 30, 1993, abandoned.

[51] Int. Cl.⁶ ............................................ G09G 3/02
[52] U.S. Cl. ............................ 345/168; 345/173; 345/2
[58] Field of Search ............................. 345/168, 158, 345/173, 2, 156

[56] References Cited

U.S. PATENT DOCUMENTS

| | | | |
|---|---|---|---|
| Re. 33,229 | 6/1990 | Schwaber | 345/156 |
| 4,333,097 | 6/1982 | Buric | 345/168 |
| 4,914,624 | 4/1990 | Dunthorn | 345/173 |
| 4,974,173 | 11/1990 | Stefik | 345/2 |
| 5,126,725 | 6/1992 | Yanagisawa | 345/168 |

FOREIGN PATENT DOCUMENTS

| | | | |
|---|---|---|---|
| 54-22718 | 2/1979 | Japan | 345/168 |
| 59-158430 | 9/1984 | Japan | 345/173 |

Primary Examiner—Curtis Kuntz
Assistant Examiner—Minsun Oh

[57] ABSTRACT

An additional status display of a touch panel on a CRT will maximize the operator's eye contact with the CRT while retaining the ability to select from the panel even though it is removed from the CRT and possibly located in another plane.

2 Claims, 1 Drawing Sheet

STATUS DISPLAY FOR REMOTELY-LOCATED CONTROL PANEL

CROSS-REFERENCE TO RELATED APPLICATION

This is a continuation of Ser. No. 08/129,969 filed Sep. 30, 1993, now abandoned.

FIELD OF THE INVENTION

This invention relates generally to displays. Specifically, the invention relates to displays and interconnected control panels.

BACKGROUND OF THE INVENTION

When acquiring acoustic data with an ultrasound imaging apparatus, the operator is required to initiate a large variety of functions from a control panel. If such functions are enabled from a control surface removed from the display, the operator will have to frequently look away from the display CRT in order to push a button or press a key, possibly missing visual data or inadvertently causing the operator to move the transducer and change the imaging plane, thus slowing down the examination process.

It would be desirable to provide some way of allowing an operator to operate the control panel while minimizing the need to break eye contact with the display.

SUMMARY OF THE INVENTION

These and other objects are achieved by the combination of a touch panel having several touch-sensitive zones and a corresponding display on an associated CRT. When the operator touches one of the zones on the touch panel, an area on the display is illuminated or otherwise changed to indicate the particular selection. With this arrangement, the operator need not look away from the CRT, where the actual ultrasound data are displayed, to make the proper selection.

The touch panel/status display could be combined with a last touch scheme. Here, the operator is permitted to move from one touch zone to another until the desired zone is reached. The last zone to be selected is interpreted to be the desired selection.

BRIEF DESCRIPTION OF THE DRAWINGS

A more complete understanding of the present invention, as well as other objects and advantages thereof not enumerated herein, will become apparent upon consideration of the following detailed description and the accompanying drawing, wherein.

DETAILED DESCRIPTION OF THE INVENTION

Figure 1:
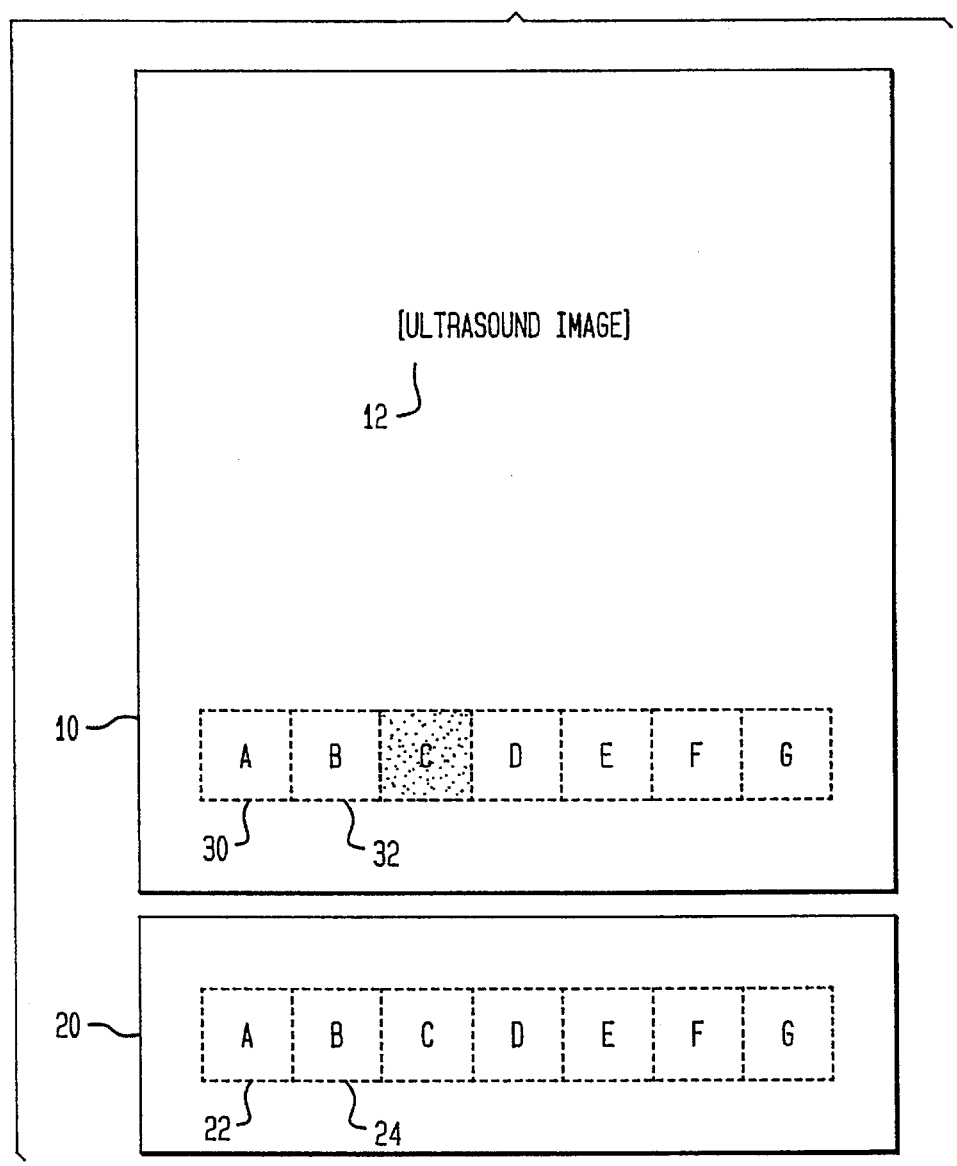
FIG. 1 is a diagram of the display and touch panel.

A CRT display 10 and an accompanying touch panel 20 are shown in FIG. 1. The display 10 is connected to an apparatus that generates the information to be displayed. Here, an ultrasound image 12 is generated and displayed by an ultrasound imaging apparatus (not shown). It should be understood that the particular type of display is neither critical nor important to this invention—any type of information can be displayed.

Removed from the CRT display 10 itself is a touch panel 20. In this embodiment, the panel 20 is touch sensitive, and registers an indication through capacitive means. Other types of control panel technologies could of course be employed.

The touch panel 20 has an array 22 of touch-sensitive zones 24, for convenience arbitrarily labeled here A through G. A status display 30 corresponding to the touch panel 20 is shown presented in the CRT display 10 below the ultrasound image 12. Similarly, the status display 30 has several zones A through G.

In an actual installation, the touch panel 20 may lie in a plane different from the face of the CRT display 10, perhaps one that is horizontal or tilted towards the horizontal. In any event, to look at the array 22 of the touch panel 20, the operator would need to look away from the CRT display 10, breaking eye contact with the activity on the screen.

To operate the touch panel 20, the operator would place a finger on the touch-sensitive zone 24 of interest, while watching the status display 30 on the CRT display 10. For example, if the operator touches the zone 24 labeled C, the corresponding zone 32 on the status display 30 will so indicate by, for example, illuminating brighter than the other zones 32 as shown by the shading in FIG. 1. Other means of indication could include flashing, a change in color, a change in the border, or some other visual effect, or an auditory signal, indicating selection of the zone in question. The sensitivity of the zones 24 can be adjusted to determine how close one must be to trigger an activation.

To allow greater flexibility for the user, the touch panel 20 can work in conjunction with software that validates the last zone 24 touched. Should the zone 24 first touched be incorrect, the operator can move to other zones 24 until the desired selection is made. The last zone 24 so chosen is then interpreted to be the correct one. Last point touched frees the operator from having to look at the touch panel 20 and losing contact with the activity occurring on the CRT display 10.

Time is an additional factor that can be used to determine when the correct or desired function has been selected. For example, the activation of any touch sensitive zone 24 can trigger a timer (either in hardware or software). After a predetermined period, the last zone 24 activated will be taken as the selected zone. Other, similar uses of the timer are also contemplated.

Figure 2:
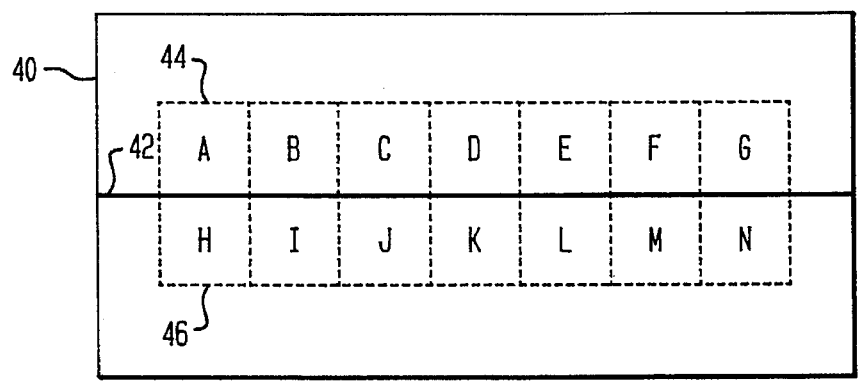
FIG. 2 is a diagram of another touch panel.

Another refinement concerns the touch panel. To help the operator locate the desired zone on a panel, the touch panel 40 shown in FIG. 2 is provided with a dividing bezel 42 as a guide that can be detected by the operator's fingers, indicating a border between one row 44 of touch sensitive zones 46 to help the operator distinguish between the two rows. The panel 40 can also have additional bezels such as vertically-oriented bezels.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, the touch panel and status display can be used with many other types of equipment beyond ultrasound imaging apparatus.

What is claimed is:

1. A display and control system comprising:
   an input control panel that includes a plurality of touch-sensitive control zones, each control zone corresponding to a predetermined function; and a display means that includes a display region, which includes a main display zone and a status display zone, in which the status display zone includes a function status zone for each of the touch-sensitive control zones, the display means:
- (i) for indicating which of the control zones a user selects by accentuating the corresponding status display zone; and
- (ii) for indicating an activated function;

timing means for determining an elapsed predetermined validation time period, the timing means resetting upon selection of any one of the control zones, the display means indicating as the activated function, only the predetermined function corresponding to a most recently selected control zone as of expiration of the predetermined validation time period; and in which the input control panel is operable by an arbitrary one of the fingers of the user;

the status display zone of the display means is separate from the control zones of the input control panel, but is sufficiently close to allow the user to continuously look at the display while simultaneously selecting functions via the input control panel.

2. A method for initiating one of a plurality of functions from a control panel, the control panel comprising a plurality of touch zones, the method comprising the steps of:

touching a first one of the plurality of touch zones, each one of the plurality of touch zones corresponding to a control function;

at a display device having a status display area comprising a plurality of status display zones corresponding to the plurality of control panel touch zones, accentuating the status display zone corresponding to the touched first one of the plurality of touch zones;

in response to the step of touching, starting a timer which times a predetermined time period;

after said step of starting, touching one or more of the plurality of touch zones;

accentuating, in turn, the most recently touched one of the plurality of touch zones while de-accentuating a previously accentuated touch zone;

resetting the timer in response to each touching of one of the plurality of touch zones; and upon the expiration of the predetermined period, activating the control function corresponding only to the most recently touched one of the plurality of touch zones.

* * * * *